Sept. 10, 1963 R. H. GERLACH 3,103,315
METHOD OF RECOVERING IRON FROM REDUCED ORES
Filed May 25, 1960

Inventor:
RUDOLPH H. GERLACH
By Toulmin & Toulmin
Attorneys 3,103,315
METHOD OF RECOVERING IRON FROM REDUCED ORES
Rudolph H. Gerlach, Bottrop, Westphalia, Germany, assignor to Beteiligungs- und Patentverwaltungsgesellschaft mit beschrankter Haftung, Essen, Germany
Filed May 25, 1960, Ser. No. 31,647
Claims priority, application Germany May 27, 1959
9 Claims. (Cl. 241—14)

The present invention relates to a method for recovering elemental metal from ores which have been subjected to a reduction process, without fusion.

In those reduction processes which employ operating temperatures below the fusion point of the metal, it is inherent that the reduced metal is dispersed in finely divided form in the reduction mass. Heretofore, the method for removing these finely divided particles has been to subject the reduction mass to a temperature above the reduction temperature and by means of a kneadable slag to form nodules or loops of the metal which can thereupon be removed from the slag, as in the case of iron, for example, by means of magnetic separators. This technique requires additional energy, in the form of higher temperatures for separation of the metal, and maintaining of a specific slag viscosity within critical limits.

To overcome these problems there have been other techniques attempted. For example, a process has been employed wherein the discharged reduction product has been finely ground in an attempt to liberate the iron from the dross mechanically. It was found, however, that in order to obtain a substantial liberation of the iron, it was necessary to grind the reduction products to an extremely finely divided state, thereby requiring excessive amounts of energy and highly expensive heavy grinding equipment. Moreover, it was found that in some reduction products, the iron was so finely divided and so highly dispersed that it was not amenable to liberation by fine grinding.

The object of the present invention, therefore, is to provide a process for separating elemental metal from slag without the disadvantages of the processes used in the prior art.

A more particular object of the present invention is to separate iron values from an iron ore which has been reduced in a revolving tubular kiln at a temperature below the melting point of the iron.

Upon further study of the specification and appended claims, other objects and advantages of the present invention will become apparent.

To accomplish these objects wherein concentrated fractions of elemental metal are obtained from a solid mass containing a substantial amount of discrete particles of said elemental metal and slag constituents within said mass, the following procedure is used:

(1) Subjecting said solid mass at temperatures below the liquidity temperature of the slag constituents and within the sintering and welding temperature range of said elemental metal to sufficiently high mechanical pressures to said mass by means of kneading or forging or milling equipment, so that the discrete particles of elemental metal are sintered, thereby forming agglomerates of said elemental metal.

(2) Cooling said sintered mass.

(3) Crushing the sintered mass containing agglomerates of elemental metal in order to obtain fractions having a higher concentration of elemental metal in said fractions than would be the case without the sintering step.

(4) Separating the richly concentrated fraction of elemental metal from the remainder of the crushed mass.

The accompanying drawings are embodiments of equipment which can be utilized to perform the sintering process, to wit:

Figure 1:
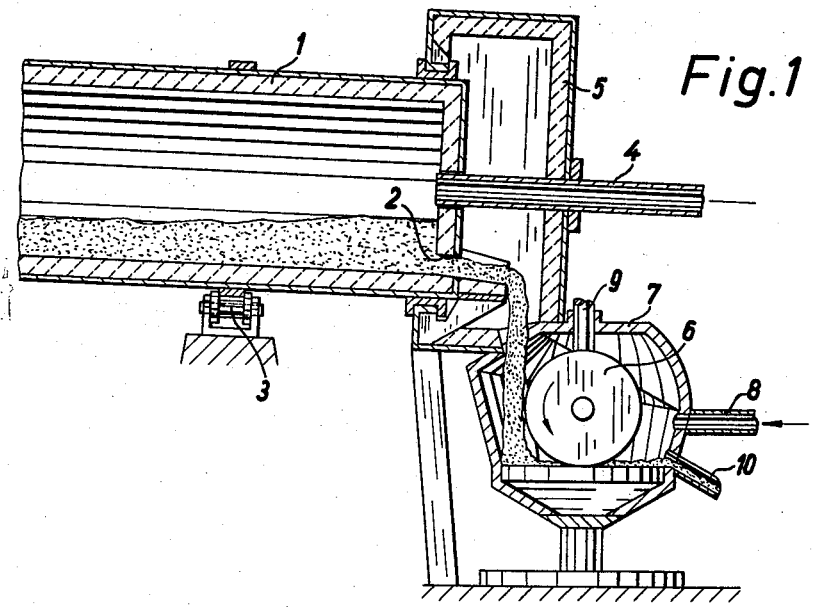
FIGURE 1 is a vertical section of equipment which can be used in a continuous process.

Referring in greater detail to the sintering step it can be visualized that the employment of pressure has two functions. Firstly, it is necessary for the finely divided discrete particles of metal to be contacted with one another; therefore by means of pressure, there is a physical movement of one particle towards the other. Secondly, once the particles are contiguous, the employment of pressure at the sintering temperatures results in the formation of a bond between two or more metallic particles. In view of this dual function of pressure, it is apparent that it would be preferable to have some mixing of the solid mass take place while the mass is under pressure. Consequently, pressurized mixing operations, such as kneading or milling are preferable.

With respect to the sintering or welding temperatures, as stated above, it is necessary that these temperatures be below the liquidity temperature of the slag constituents. In addition, it is also necessary that these temperatures be below the melting point of the metal. In general, assuming the sintering or welding temperature is below the liquidity temperature of the slag constituents, it is desirable to maintain said sintering or welding temperature for iron containing masses between 700° C. and 1150° C. For optimal sintering conditions, it is preferred to maintain the sintering range between 900° C. and 1100° C.

It is difficult to ascertain the precise degree of mixing or pounds per square inch of pressure which is optimal for this process. In general, however, it is desirable to subject the mass to a pressure sufficient to crush the slag constituents.

Witth regard to theextent of time that is required for the sintering or welding operation, obviously, the degree of aggregation is related to the time of sintering or welding. However, it can easily be seen that a minor, finite sintering residence time (such as a fraction of a second in the case of a crushing blow of a forge, and the like), results in a finite degree of sintering. Consequently, the residence time that is employed will depend on the properties of the reduction product and the particular economic conditions pertinent to each situation.

With respect to the environment of the sintering step, it is preferred that it be conducted in a non-oxidizing atmosphere. Therefore, the elimination of air and other oxidizing gases is desirable. It is comparatively easy to eliminate the oxidizing gases if the aggregation takes place inside the kiln at its discharge end. The pressure to which the reduction product is being submitted can be exercised by roller bodies rolling in the revolving kiln and having a non-circular cross-section, preferably of four or more sides.

A major advantage obtained from this sintering step is gained from the fact that the formation of hard crystalline slags which heretofore have proven to be extremely difficult to crush into fine particles is prevented.

With respect to step (2), the cooling step, it is generally acceptable if the sintered mass is cooled to 500–600° C. For preferred operating conditions, however, it is desirable to cool to ambient temperature.

With respect to step (3), the crushing step, it can be appreciated that the optimum desired particles size for the purposes of separation is, in fact, the particle size of the metallic parts. In practice, however, it is very expensive to grind the reduction product so finely. As a matter of fact, it has been found that even a comparatively minor amount of crushing functions to separate the metallic agglomerates into more concentrated fractions than would have been the case without a sintering or welding step. Naturally, the size reduction that is acceptable for one set of conditions may not be acceptable for another set of conditions because of the nature of the sintered mass (particle size of agglomerates), and the economic conditions pertinent thereto.

In applying the present invention to the reduction of iron ore, it can be seen by FIGURE 1 how this may be accomplished. A cylindrical furnace 1 rotatably journaled on rolls 3 is provided with openings 2 at its discharge end. This furnace may be heated by any conventional medium, such as gas, oil or coal dust by means of burner 4. Affixed to its discharge end is a stationary chamber 5 below which a pressurizing and mixing channel 6 is arranged. The pressurizing and mixing channel 6 is surrounded by a housing 7 which contains gas inlet pipe 8. The grinding and mixing device is driven by shaft 9 which is attached to any conventional motor (not shown). Associated with said device is channel 10.

The operation of this embodiment is as follows:

The ore is reduced without fusion in the cylindrical furnace 1 and is then transported through openings 2 into chamber 5, wherein it then falls into the edge mill 6. Through pipe 8 is introduced a non-oxidizing gas, such as nitrogen. After the reduction product is pressurized and mixed in the edge mill 6, it is then cooled by means of the non-oxidizing gas and is then discharged through channel 10.

Figure 2:
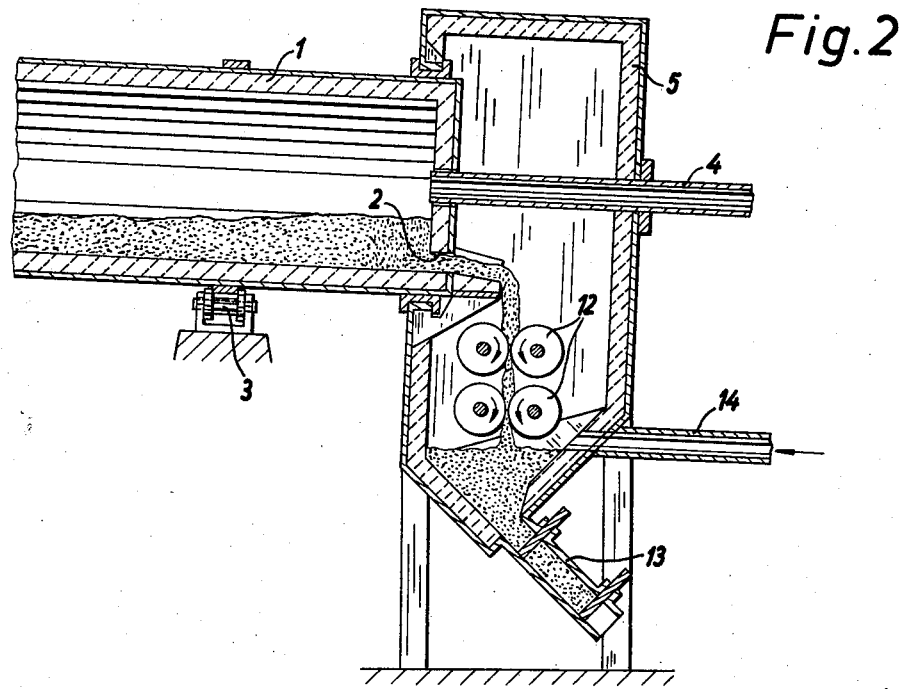
FIGURE 2 shows another piece of equipment wherein the kneading or pressurizing of the reduction product is conducted by means of rollers.

FIGURE 2 shows another embodiment of this operation which can perform the process of the present invention. In this device, the material is kneaded by means of rollers 12 which are arranged in chamber 5. These rollers 12 which are arranged in the direction indicated by the arrows and thereby press the reduction material in such a way that the iron particles are sintered. Through opening 13, the reduction material is discharged from chamber 5. To cool the sintered reduction material a non-oxidizing gas can be introduced through pipe 14.

To further illustrate the present invention, the following non-limitative example is presented:

EXAMPLE 1

In a revolving cylindrical furnace, an ilmenite concentrate analyzing about 44% $TiO_2$ and 34–36% iron was reduced with fine coke at a maximum temperature of about 1250° C. The reduction product was then discharged at a temperature of about 1100–1200° C. Sample batches of this material were then taken. One batch was allowed to cool naturally. The other batch, without any significant cooling taking place, was then introduced into a die and was hammered therein in order to sinter the metallic iron in accordance with this invention. After both the original reduction product batch and the sintered batch were cooled, they were both ground down to a particle size of about 1 mm. and then freed from unreacted excess carbon by means of a magnetic separator. The carbon-freed samples were then further reduced in size to the following three particle size:

Less than 0.2 mm.
Less than 0.1 mm.
Less than 0.06 mm.

Each of these particle sizes were then individually separated in a Davis Tube apparatus (Davis Tube apparatus utilizes a wet magnetic principle and is described by Edward W. Davis in the publication "Mechanical Roasting of Iron Ore," in a bulletin of the University of Minnesota, vol. 40, No. 42, May 10, 1937, pages 13–15). For each particle size, the $TiO_2$ content was determined separately for the magnetic and non-magnetic fraction. In the magnetic fraction (iron concentrate) the content of metallic iron was then analyzed. The results of several samples subjected to this procedure are reported in the following Table 1 which shows that the concentration of metallic iron is increased as the particle size is lowered. Correspondingly, the content of $TiO_2$ in the iron concentrate is lessened as the particle size is lowered. Furthermore, this table demonstrates the utility of the present invention, as, for example, it shows in the right hand column in samples 9–16 that much better separations are obtained when the sintering step is performed.

Table 1

[$TiO_2$ and Fe in the Fe concentrate ($TiO_2$+Fe=100)]

| Not Kneaded And Sintered | | | | Kneaded And Sintered | | | |
| --- | --- | --- | --- | --- | --- | --- | --- |
| Sample No. | Particle size | Percent $TiO_2$ by weight | Percent Fe by weight | Sample No. | Particle size | Percent $TiO_2$ by weight | Percent Fe by weight |
| 1 | 0.2 | 49.65 | 50.35 | 9 | 0.2 | 33.07 | 66.93 |
| | 0.1 | 44.14 | 55.86 | | 0.1 | 33.58 | 66.42 |
| | 0.06 | 39.11 | 60.09 | | 0.06 | 30.73 | 69.27 |
| 2 | 0.2 | 50.00 | 50.00 | 10 | 0.2 | 34.73 | 65.27 |
| | 0.1 | 44.48 | 55.52 | | 0.1 | 31.47 | 68.53 |
| | 0.06 | 29.24 | 70.76 | | 0.06 | 23.59 | 76.41 |
| 3 | 0.2 | 46.31 | 53.69 | 11 | 0.2 | 37.46 | 62.54 |
| | 0.1 | 34.47 | 65.53 | | 0.1 | 25.90 | 74.10 |
| | 0.06 | 29.41 | 70.59 | | 0.06 | 21.39 | 78.61 |
| 4 | 0.2 | 41.53 | 58.47 | 12 | 0.2 | 32.36 | 67.14 |
| | 0.1 | 35.52 | 64.48 | | 0.1 | 24.30 | 75.70 |
| | 0.06 | 33.33 | 66.67 | | 0.06 | 21.66 | 78.34 |
| 5 | 0.2 | 45.61 | 54.39 | 13 | 0.2 | 30.00 | 70.00 |
| | 0.1 | 34.53 | 65.47 | | 0.1 | 29.52 | 70.38 |
| | 0.06 | 29.08 | 70.92 | | 0.06 | 18.46 | 81.54 |
| 6 | 0.2 | 43.63 | 56.37 | 14 | 0.2 | 29.51 | 70.49 |
| | 0.1 | 40.07 | 59.93 | | 0.1 | 30.03 | 69.97 |
| | 0.06 | 28.82 | 71.18 | | 0.06 | 22.08 | 77.92 |
| 7 | 0.2 | 46.38 | 53.62 | 15 | 0.2 | 43.71 | 56.29 |
| | 0.1 | 36.58 | 63.42 | | 0.1 | 33.93 | 66.07 |
| | 0.06 | 28.53 | 71.47 | | 0.06 | 27.43 | 72.57 |
| 8 | 0.2 | 48.00 | 52.00 | 16 | 0.2 | 32.36 | 67.64 |
| | 0.1 | 42.43 | 57.57 | | 0.1 | 27.35 | 72.65 |
| | 0.06 | 33.59 | 66.41 | | 0.06 | 21.85 | 78.15 |

Table 2 also shows the effectiveness of the present invention with respect to the distribution of $TiO_2$ in the magnetic concentrate (iron) and the non-magnetic concentrate. As in the format of Table 1, the left hand side shows samples which were not subjected to the kneading and sintering step of the present invention, and the right hand side shows samples which were so treated. It is believed apparent that this table, like Table 1, markedly demonstrates the fact that much less particule size diminution is required for a given separation when the reduction product is kneaded and sintered.

Table 2

[Parts of $TiO_2$ from the Fe concentrate and $TiO_2$ concentrate]

| Not Forged | | | | Forged | | | |
| --- | --- | --- | --- | --- | --- | --- | --- |
| Sample No. | Particle size | Percent $TiO_2$ by weight | Percent Fe by weight | Sample No. | Particle size | Percent $TiO_2$ by weight | Percent Fe by weight |
| 17 | 0.2 | 49.50 | 50.50 | 20 | 0.2 | 24.19 | 75.81 |
| | 0.1 | 42.50 | 57.60 | | 0.1 | 24.61 | 75.39 |
| | 0.06 | 32.42 | 67.58 | | 0.06 | 19.71 | 80.29 |
| 18 | 0.2 | 74.35 | 26.65 | 21 | 0.2 | 32.47 | 67.53 |
| | 0.1 | 56.70 | 43.30 | | 0.1 | 26.49 | 73.51 |
| | 0.06 | 33.87 | 66.13 | | 0.06 | 17.07 | 82.93 |
| 19 | 0.2 | 58.84 | 41.16 | 22 | 0.2 | 32.62 | 67.38 |
| | 0.1 | 36.61 | 63.39 | | 0.1 | 22.76 | 77.24 |
| | 0.06 | 27.24 | 72.76 | | 0.06 | 17.20 | 82.80 |

As stated previously, the aforesaid examples are merely non-limitative embodiments of the present invention. Obviously, this invention can be applied to any reduction product which contains discrete weldable particles of metal intermixed in a slag.

Obviously, this invention can be used irrespective of the relative proportions of slag and metal in the reduction product. However, the present invention is particularly useful for those reduction products having substantial amounts of both materials such as about 30 to 80% metal and 70 to 20% slag constituents.

What I claim is:

1. A process for obtaining concentrated fractions of elemental metal from a solid mass of a reaction product obtained from a reduction of an ore at temperatures lower than the melting point of said elemental metal, said solid mass containing both a substantial amount of discrete particles of said elemental metal and slag constituents intermixed within said mass which process comprises the after-reduction steps of: subjecting said mass to sufficiently high mechanical pressure to crush the slag constituents, and to temperatures within the sintering or welding temperature range of said elemental metal so that a portion of said discrete particles are sintered, thereby forming discrete sintered agglomerates of said elemental metal; cooling said sintered mass; crushing the cooled mass to obtain fractions having a richer concentration of elemental metal in said fraction than would be the case without said sintering step; and separating said richly concentrated fractions from the remainder of the crushed mass.

2. In a process for reducing iron ores to a solid iron reduction product without fusion, the improvement which comprises the after-reduction steps of subjecting said reduction product to sufficiently high mechanical pressure at temperatures below the liquifying temperature of the slag constituents and within the sintering and welding temperature range of said elemental metal so that a portion of said discrete particles are aggregated, thereby forming discrete sintered agglomerates of said elemental metal; cooling said sintered mass; crushing the cooled mass to obtain fractions having a richer concentration of elemental metal in said fraction than would be the case without said sintering steps; and separating said richly concentrated fractions from the remainder of the crushed mass.

3. The process of claim 2, wherein said high pressures are obtained by kneading the mass.

4. The process of claim 3, wherein the sintered mass is crushed to a particle size less than 0.2 mm.

5. The process of claim 2, wherein the discrete particles are aggregated at 700–1150° C.

6. The process of claim 2, wherein the discrete particles are aggregated at 900–1100° C.

7. The process of claim 2, wherein the discrete particles are aggregated at 700–1150° C., and wherein the sintered mass is cooled to 400–600° C.

8. The process of claim 2, wherein the discrete particles are aggregated at 700–1150° C., and wherein the sintered mass is cooled to ambient temperature.

9. A process for obtaining concentrated fractions of elemental iron from a solid mass containing both a substantial amount of discrete particles of said elemental iron and slag constituents intermixed within said mass, which comprises the steps of: sintering a portion of said discrete particles of elemental iron together to form sintered agglomerates of said elemental iron, by subjecting said mass at 700–1150° C. to sufficient external mechanical pressure to crush the slag constituents; cooling said sintered mass; crushing the cooled mass to obtain fractions containing a richer concentration of elemental iron in said fractions than would be the case without said sintering step; and separating said richly concentrated fractions from the remainder of the crushed mass.

References Cited in the file of this patent

UNITED STATES PATENTS

| 2,603,423 | Buehl | July 15, 1952 |
| 2,740,709 | Herres et al. | Apr. 3, 1956 |
| 2,860,044 | Brundin | Nov. 11, 1958 |

FOREIGN PATENTS

| 792,300 | Great Britain | Mar. 26, 1958 |
| 818,002 | Great Britain | Aug. 12, 1959 |

OTHER REFERENCES

Taggart: Handbook of Mineral Dressing, John Wiley & Sons, Inc., New York (1945). Pages 5–104, 5–105, 14–23, and 14–24.